Oct. 6, 1925.
L. EMBREY
DOUGH DIVIDING MACHINE
Filed Dec. 6, 1923  3 Sheets-Sheet 1
1,556,317
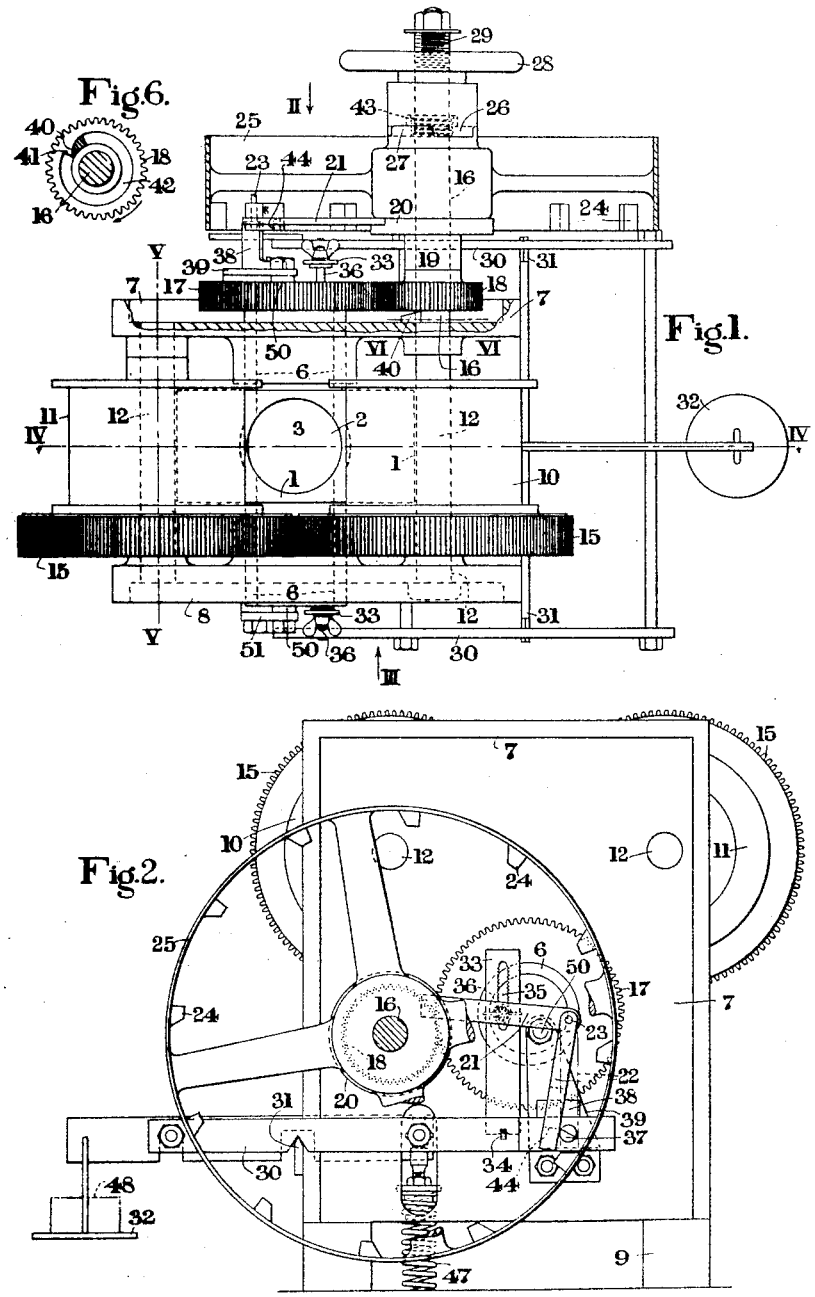
Inventor,
L. Embrey,
by
Atty.

Oct. 6, 1925.　　　　　　　　　　　　　　　　　　　1,556,317
L. EMBREY
DOUGH DIVIDING MACHINE
Filed Dec. 6, 1923　　　3 Sheets-Sheet 2

Inventor,
L. Embrey,
by
atty.

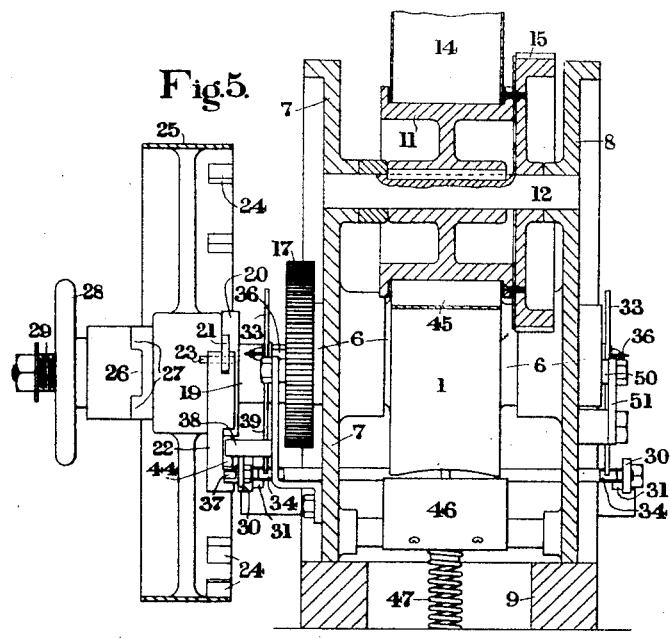

Patented Oct. 6, 1925.

1,556,317

UNITED STATES PATENT OFFICE.

LAURENCE EMBREY, OF BLURTON, ENGLAND.

DOUGH-DIVIDING MACHINE.

Application filed December 6, 1923. Serial No. 679,009.

*To all whom it may concern:*

Be it known that I, LAURENCE EMBREY, a subject of the King of Great Britain, residing at Blurton, in the county of Stafford, England, have invented certain new and useful Improvements in Dough-Dividing Machines, of which the following is a specification.

This invention relates to improvements in dough dividing machines of the known type wherein dough is fed into a cylinder and thereby forces back a piston therein, the cylinder being then moved into a discharging position so that the piston can discharge the dough. Hitherto the dough has been forced by a plunger or other means into the cylinder and the impact of the plunger has had a detrimental effect on the dough.

The object of the invention is to provide a dough dividing machine in which this detrimental action is avoided by the use of feeding mechanism which is gentle in its action and, moreover, has merely to fill the cylinder with dough against the action of a scale beam which determines when the feeding operation shall cease and the discharge shall take place.

In the drawings:

Figure 1 is a plan of one form of dough dividing machine according to the invention.

Figures 2 and 3 are side elevations seen in the directions of the arrows II and III, Figure 1, respectively.

Figure 5 is an end sectional elevation on the line V—V Figure 1.

Figure 6 is a section of a detail on the line VI—VI Figure 1.

Figure 7 is an end elevation of an alternative form of cam mechanism.

Figure 8 is a sectional elevation on VIII—VIII Figure 7.

Figure 9 is a fragmentary elevation partly in section showing a cylinder fitted with a modified form of cam and with regulating shutters.

Figures 10 and 11 are respectively a side elevation and plan of the scale beam fitted with an auxiliary frame.

Figure 12 is a plan of an alternative form of clutch for the driving shaft.

Figure 3:
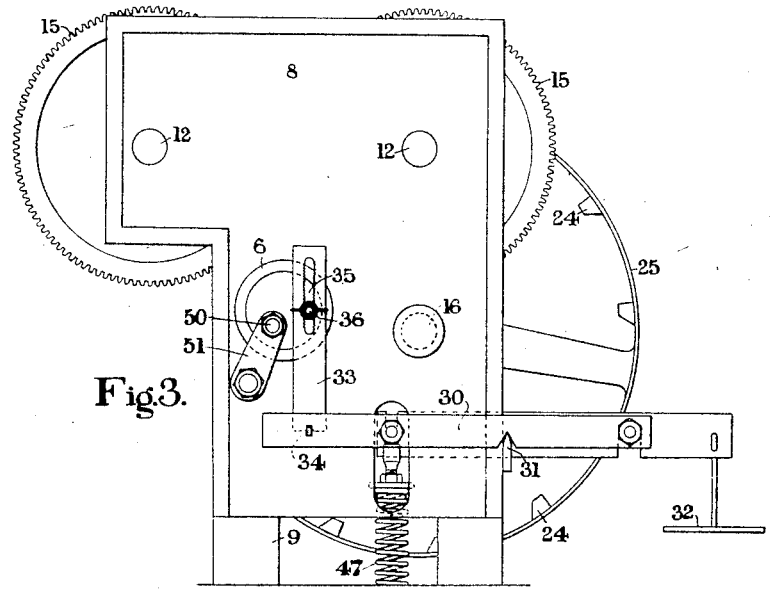
Figure 4:
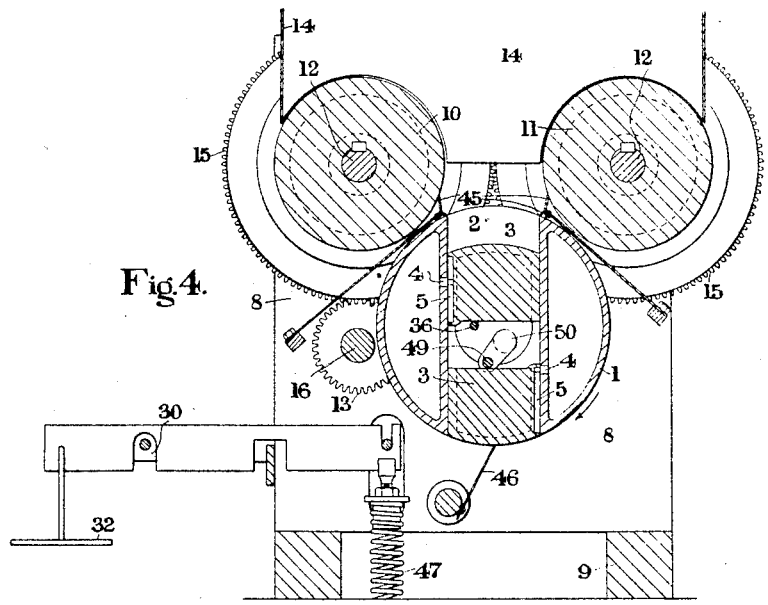
Figure 4 is a side sectional elevation on the line IV—IV Figure 1.

In the form of machine illustrated a cylinder carrier 1 is provided with a cylinder 2 fitted with pistons 3 which are free to slide therein within the limits allowed by pins 4 fixed in the carrier and entering slots 5 in the pistons. Each end of the cylinder 2 constitutes a cylinder for the reception of dough above its respective piston 3.

The cylinder carrier 1 has hollow trunnions 6 supported in the side plates 7 and 8 of the main framework 9 of the machine.

Feeding rollers 10 and 11 are mounted on shafts 12 carried by the side plates 7 and 8, and a hopper 14 for dough is provided around the feeding rollers. Intermeshing gear wheels 15 are mounted on the shafts 12 of the feeding rollers and one of the gear wheels 15 is driven by a pinion 13 mounted on a shaft 16 supported by the side plates 7 and 8. A gear wheel 17 fixed on the one trunnion 6 of the cylinder carrier is driven by a pinion 18 which is freely mounted on the shaft 16. The pinion 18 is fixed to or integrally formed with a sleeve 19 having a flange 20 provided with an arm 21 on which a pawl 22 is pivoted at 23. Under certain conditions, hereinafter explained, the pawl 22 engages with teeth 24 on a driving pulley 25 which is freely mounted on the shaft 16, but is adapted to be secured thereto, for instance, by a clutch comprising a jaw member 26 splined to the shaft 16 and a jaw member 27 on the pulley 25. The jaw member 26 is adjustable axially on the shaft 16 by means of a hand nut 28 screwed on to the screw threaded end 29 of the shaft 16. A spring 43 is interposed between the two jaw members 26 and 27 and tends to hold the two out of engagement, under which conditions the pulley 25 rotates freely on the shaft 16 and the feeding rollers 10 and 11 are stationary. A cone clutch may be used instead of a jaw clutch, a conical member 26', Figure 12, and a member having a corresponding conical cavity 27', being substituted for the jaw members 26 and 27 respectively.

A scale beam 30 is fulcrumed on knife edges 31. It has a pan 32 at one end for the reception of weights by which the weight of the pieces of dough to be divided is determined. At the opposite end to the weight pan 32 the scale beam 30 supports two upright bars 33 on knife edges 34. The bars 33 have slots 35, the edges of which are serrated so as to support adjustably a crossbar 36, which passes through the hollow trunnions 6 across the cylinder 2 between the adjacent ends of the two pistons 3. A pin 37 on the scale beam 30 holds the pawl 22 out of engagement with the teeth 24 on the pulley 25 so long as the scale beam 30 is in a normal or horizontal position, but when the scale beam is tipped, as hereinafter explained, the pin 37 releases the pawl 22 and allows it to fall into engagement with the nearest tooth 24, so that the pulley 25, can then rotate the cylinder carrier 1 through the medium of the pawl 22, the arm 21, the sleeve 19, the pinion 18 and the gear wheel 17. In order that the rotary movement of the cylinder carrier 1 shall be limited to that required to bring one end of the cylinder 2 from a position adjacent to and just below the hopper to a discharge position remote therefrom, i. e. a half-revolution in the example illustrated, the pawl 22, on completing a revolution with the pulleys 25, strikes a tappet 38 on a bracket 39 bolted to the side plate 7, whereby the pawl is disengaged from the teeth of the pulley. When this happens it is necessary that the feeding rollers shall rotate and feed dough into the end of the cylinder 2 then adjacent to the hopper, and for this purpose a fixed cam 40 is provided on the side plate 7 opposite to the pinion 18 which has a cooperating cam surface 41, Figure 6. While the pawl 22 is in engagement with the pulley 25 and is driving the pinion 18, the fixed cam 40 is situated in a circular groove 42 in the pinion 18, but just before the pawl is disengaged from the pulley 25 the cam surface 41 on the pinion 18 rides over the fixed cam 40, so that the pinion 18 and the pulley 25 are moved axially along the shaft 16 and the jaw clutch members 26 and 27 are engaged with one another, the spring 43 being compressed.

The pawl 22 has a notch 44, Figure 5, which enables it to clear the tappet 38 when it moves into engagement with a tooth on the pulley 25.

A stationary bar 49 is held by a cranked bar 50 which is secured to the two side plates 7 and 8 by brackets 39 and 51.

The purpose of the bar 49 is to thrust each piston 3 in turn outwardly to discharge the dough when the cylinder carrier 1 rotates.

Scrapers 45 are provided for the feeding rollers 10 and 11 and a scraper 46 for the cylinder carrier 1 and the ends of the pistons as they pass it.

A buffer spring 47 is provided for the scale beam.

In operation, assuming that the cylinder carrier 1 is stationary with the cylinder 2 below the hopper 14, the pulley 25 is clutched to the shaft 16, as shown in Figure 1, so that the feeding rollers 10 and 11 are being rotated to feed dough into the adjacent end of the cylinder 2, thereby depressing the adjacent piston 3. When the pressure of this piston 3 on the cross-bar 36 is sufficient to overcome the weight 48 (Figure 2) placed in the scale pan 32, the scale beam 30 is tipped, resulting in release of the pawl 22, which thereupon engages with a tooth of the pulley 25. The pinion 18 is thereby rotated to rotate the cylinder carrier and to move the pulley 25 axially to disengage the clutch members 26 and 27, so that the feeding rollers cease to rotate.

During the rotation of the cylinder carrier 1 the dough previously fed into the cylinder 2 above the piston 3 is cut off from the dough in the hopper and then the depressed piston 3 is forced against the stationary bar 49 and thereby moved outwardly to discharge the dough in front of it. At the same time the other piston, which had previously been brought to the discharging position, is brought round to the hopper so that the adjacent end of the cylinder is ready to receive dough, the pawl 22 being disengaged from the pulley 25 so that the cylinder carrier 1 is arrested and the feeding rollers are again rotated. The dough pressed into the cylinder 2 above the piston 3 and cut off from that in the hopper should be equal in weight to the weight on the scale pan. In other words the pressure necessary to tip the scale should necessitate a fixed volume of dough at a certain density. When the cylinder 2 is filled with dough the continued rotation of the feeding rollers 10 and 11 tending to feed more dough into the cylinder sets up a pressure in the dough in the cylinder or increases its density. When this pressure acting on the piston 3 is sufficient to tip the scale the feeding action ceases and the cylinder is revolved so that the fixed volume of dough at the required density to ensure the required weight of dough is cut off and discharged as above described.

In a modified form the pinion 18, Figures 7 and 8, is provided with a cam 52 for engagement with a tappet 53 carried by a bracket 54 secured to the side plate 7.

In a modified form the aforesaid cranked bar 50 is replaced by a straight bar 56, Figure 9, carrying a cam 55 instead of the stationary bar 49. By rotatably adjusting the bars 50 or 56 in the side brackets 39 and 51, (Figures 1 and 5) the bar 49 or cam 55 may be adjusted to vary the time of discharge movement of the pistons. In order to regulate the flow of dough into the cylinder 2 a pair of adjustable shutters 62 (Figure 9) are provided. These are supported by rods 63 adjustably secured by nuts 65 in slots 64 in the side plates 6 and 7.

In the form shown in Figures 10 and 11 the scale beam 30 is provided with an auxiliary frame 57 pivoted to the scale beam at 58. The auxiliary frame 57 carries the cross bar 36 at one end for engagement with the pistons 3. At the other end the frame 57 has a bar 67 on which bears a screw 59 which passes through a screw threaded hole in a cross bar 60 carried by the scale beam 30 and has a head 61 by which it can be turned by hand to adjust the cross bar 36 relatively to the scale beam 30 and thereby to vary the relation of the cross bar to the pistons 3 to regulate the capacity of the cylinder 2 above each piston for the reception of dough.

I claim:—

1. A dough dividing machine comprising a scale beam, a weight pan on one end of said beam, a cylinder having a piston supported adjacent to the other end, means for feeding dough into said cylinder, and means controlled by the scale beam for rotating said cylinder into a discharging position when the pressure of dough on the piston is sufficient to tip the scale beam, substantially as and for the purpose hereinbefore set forth.

2. A dough dividing machine comprising a scale beam, a weight pan on one end of said beam and a cylinder having a piston supported adjacent to the other end, means for rotating said cylinder intermittently, means for feeding dough into said cylinder intermittently, and means controlled by the scale beam for bringing said cylinder rotating means and said dough feeding means into action alternately, substantially as and for the purpose hereinbefore set forth.

3. A dough dividing machine comprising a scale beam, a weight pan on one end and a cylinder having a piston supported adjacent to the other end, a hopper having rollers for feeding dough into said cylinder, driving gear for said feeding rollers and a driving gear for rotating said cylinder, a main driving wheel for driving both sets of gearing, and means operable by the scale beam for engaging and disengaging said main driving wheel alternately with and from said sets of gearing whereby the cylinder is held stationary in a receptive position while the feeding rollers are operating and when dough of predetermined pressure value has depressed the piston and the adjacent end of the scale pan the feeding rollers cease to rotate and the cylinder is rotated into a discharging position.

4. A dough dividing machine comprising a cylinder fitted with a free piston, a pair of rollers for feeding dough into the cylinder to depress said piston, a scale beam depressible by said piston, driving mechanism for driving said feeding rollers and for rotating said cylinder into a discharging position and means operable by said scale beam for putting said feeding rollers and said cylinder alternately in driving connection with said driving mechanism, substantially as and for the purpose hereinbefore set forth.

5. A dough dividing machine comprising a cylinder fitted with a free piston, a pair of rollers for feeding dough into the cylinder to depress said piston, a scale beam depressible by said piston, driving mechanism for driving said feeding rollers and for rotating said cylinder into a discharging position and means operable by said scale beam for putting said feeding rollers and said cylinder alternately in driving connection with said driving mechanism, and means for moving the piston in the cylinder during the rotation of the cylinder to effect discharge of the dough, substantially as and for the purpose hereinbefore set forth.

6. A dough dividing machine comprising a cylinder carrier having cylinders, pistons in said cylinders, a hopper for dough, rollers for feeding dough from said hopper to the cylinders, two sets of gearing for rotating said rollers and said cylinder carrier respectively, a driving element, two pinions for driving said gearing, a scale beam depressible by each piston as it is depressed by the dough fed into its respective cylinder, and means operable by said scale beam for alternately connecting said pinions to said driving element, substantially as and for the purpose hereinbefore set forth.

7. A dough dividing machine comprising a cylinder carrier having a plurality of cylinders each fitted with a free piston, a hopper for dough, means for intermittently rotating said cylinder carrier beneath said hopper to bring the cylinders successively from a feeding position opposite to said hopper and to a discharge position away therefrom, rollers in said hopper for feeding dough to each cylinder to depress the piston therein, main driving mechanism for rotating said feeding rollers and said cylinder carrier, a scale beam depressible by each cylinder as it is depressed by dough, means operable by said scale beam for alternately engaging and disengaging said feeding rollers and said cylinder carrier with and from said main driving mechanism, and means for returning each piston to its initial position before it reaches the hopper.

8. A dough dividing machine comprising a cylinder carrier having cylinders fitted with pistons, a hopper for dough fitted with feeding rollers, a shaft for driving said rollers, a driving pulley freely mounted on said shaft and having teeth, a clutch for connecting said pulley to said shaft when said pulley is moved axially thereon in one direction, a spring for moving said pulley axially in the opposite direction to disengage said clutch, means for controlling the axial movement of said pulley comprising a fixed cam and a sleeve freely mounted on said shaft and engaging with said cam, a pinion connected to said sleeve, a toothed wheel meshing with said pinion and connected to said cylinder carrier, a scale beam depressible by said pistons, said scale beam in its normal position holding said pawl out of engagement with the teeth on the aforesaid pulley and adapted when depressed to free said pawl to allow it to engage with said teeth, whereby the driving pulley is declutched from the aforesaid shaft and the pawl carrying sleeve is rotated by said pulley through said pawl and rotates the cylinder carrier to remove a cylinder from the hopper, while the feeding rollers remain stationary, said scale beam on its return to normal position being adapted to disengage said pawl when a succeeding cylinder has reached the hopper, substantially as and for the purpose hereinbefore set forth.

9. In a dough dividing machine comprising a rotary cylinder provided with a sliding piston, means for feeding dough on to said cylinder against said piston, a scale beam, and means controlled by the scale beam for rotating said cylinder after it has been fed with dough, shutters for varying the flow of dough into said cylinder, substantially as and for the purpose hereinbefore set forth.

10. In a dough dividing machine comprising a rotary cylinder provided with a sliding piston, means for feeding dough into said cylinder against said piston, a scale beam adapted to be tipped by said piston when forced back by the fed dough, and means controlled by the scale beam for rotating said cylinder after it has been fed with dough, means for varying the relation of said beam and piston when the cylinder is in its feeding position, substantially as and for the purpose hereinbefore set forth.

In testimony whereof I have signed my name to this specification.

LAURENCE EMBREY.